(12) United States Patent
Martin et al.

(10) Patent No.: US 8,453,947 B2
(45) Date of Patent: Jun. 4, 2013

(54) AGRICULTURAL VEHICLE AND SYSTEM

(76) Inventors: Charles H. Martin, Loysville, PA (US); Dominic Martin, Loysville, PA (US)

( * ) Notice: Subject to any disclaimer, the term of this patent is extended or adjusted under 35 U.S.C. 154(b) by 304 days.

(21) Appl. No.: 12/891,758

(22) Filed: Sep. 27, 2010

(65) Prior Publication Data

US 2011/0073026 A1   Mar. 31, 2011

Related U.S. Application Data

(60) Provisional application No. 60/246,036, filed on Sep. 25, 2009.

(51) Int. Cl.
| | |
|---|---|
| *A01C 23/008* | (2006.01) |
| *A01C 23/047* | (2006.01) |
| *A01G 25/09* | (2006.01) |
| *A01M 7/0042* | (2006.01) |
| *A01M 7/0053* | (2006.01) |
| *A01M 7/0071* | (2006.01) |
| *A01M 7/0082* | (2006.01) |
| *B05B 13/005* | (2006.01) |
| *B05B 13/0214* | (2006.01) |

(52) U.S. Cl.
USPC ........... 239/163; 239/167; 239/732; 239/734; 239/754; 239/DIG. 12

(58) Field of Classification Search
USPC ......... 111/170, 200, 52–71, 79, 81, 134–138; 172/776; 239/146, 159, 163–170, 176, 722, 239/726, 732, 734, 754, 302, DIG. 12; 414/547
See application file for complete search history.

(56) References Cited

U.S. PATENT DOCUMENTS

| | | | | |
|---|---|---|---|---|
| 2,091,077 | A | * | 8/1937 | Limbach ......................... 56/253 |
| 4,296,695 | A | | 10/1981 | Quanbeck |
| 4,700,640 | A | | 10/1987 | Anderson |
| 5,039,129 | A | | 8/1991 | Balmer |
| 5,086,847 | A | * | 2/1992 | Meiners ......................... 172/466 |
| 5,597,172 | A | | 1/1997 | Maiwald et al. |
| 7,073,735 | B2 | | 7/2006 | Wubben et al. |
| 2006/0260523 | A1 | | 11/2006 | Claydon |
| 2009/0101371 | A1 | * | 4/2009 | Melanson et al. ................ 172/6 |
| 2009/0192654 | A1 | | 7/2009 | Wendte et al. |

\* cited by examiner

*Primary Examiner* — Christopher J Novosad
(74) *Attorney, Agent, or Firm* — McNees Wallace & Nurick LLC

(57) ABSTRACT

An apparatus and method are disclosed for applying an agricultural material through a standing crop. The apparatus is capable of adjusting the height and width of the frame of the apparatus. A trailer is disclosed that is capable of adjusting trailer width to transport the apparatus.

14 Claims, 21 Drawing Sheets

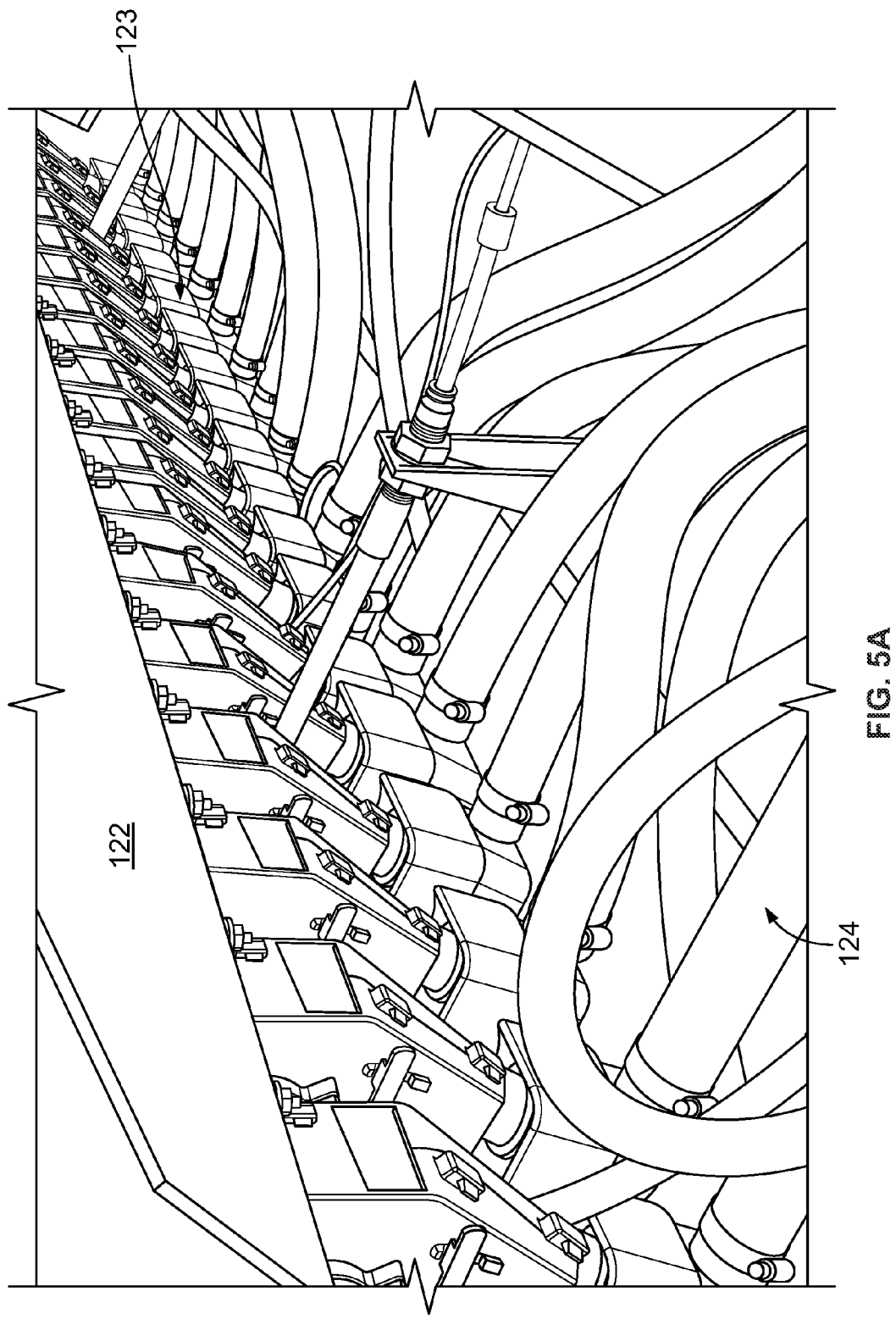

AGRICULTURAL VEHICLE AND SYSTEM

CROSS-REFERENCE TO RELATED APPLICATIONS

This application claims priority to U.S. Provisional Patent Application No. 61/246,036 filed on Sep. 25, 2009, entitled "SELF-PROPELLED AGRICULTURAL VEHICLE", which is herein incorporated by reference in its entirety.

FIELD

The present disclosure is generally directed to agricultural vehicles, and is more particularly directed to an apparatus and method for spreading an agricultural material, such as seed, within mature crops.

BACKGROUND

"No till" farming has recently gained popularity among conservationists and economically minded farmers as a way to reduce erosion, fuel consumption, irrigation and fertilizer runoff. The "no till" concept removes the step of tilling a previous crop prior to planting the next successive crop. In the past, this concept has been applied to not tilling between the stubble from a previous crop prior to planting the next successive crop.

What is needed is a method and system for seeding between rows of mature, standing crops.

SUMMARY OF THE DISCLOSURE

In an exemplary embodiment, a self-propelled agricultural vehicle is disclosed that includes a frame, a material distribution system attached to the frame, and a lift system attached to the body.

According to one embodiment, an apparatus for applying an agricultural material is disclosed that includes a frame having a height above a support surface, a material distribution system attached to the frame, and a plurality of wheel assemblies having a length and attached to the frame. The plurality of wheel assemblies are capable of extending in length so as to increase the height of the frame above the support surface. The height of the frame above the support surface is between about three feet and about eighteen feet.

According to another embodiment of the present invention, a trailer is disclosed that includes a frame including a center section and wheel ramps disposed on opposite sides thereof. The wheel ramps include a front section, a rear section, and a middle section disposed there between. At least one wheel is attached to the middle section The middle section is configured to retract beneath the center section so as to dispose the at least one wheel between the front section and the rear section.

According to another embodiment of the present invention, an agricultural apparatus is disclosed that includes an applicator for applying an agricultural material. The applicator includes a frame having a height above a support surface, a material distribution system attached to the frame, and a front pair of wheel assemblies and a rear pair of wheel assemblies. The front and rear wheel assemblies have a length and are attached to the frame. The apparatus further includes a trailer for transporting the applicator. The trailer includes a front, a rear, and sides disposed there between. A pair of opposing wheels are attached to the sides. The applicator is loaded onto trailer while the trailer has the wheels disposed at a first width, and the wheels are retracted to a second width between the front and rear wheel assemblies for transport.

According to yet another embodiment of the present invention, a method is disclosed that includes providing a material applicator having a range of application heights, adjusting the application height of the material applicator above an agricultural crop, and applying an agricultural material while traversing the agricultural crop. The application height is between 4 and 16 feet.

One advantage of the present disclosure is to provide an apparatus for applying a material between rows of standing crops.

One advantage of the present disclosure is to provide an apparatus for seeding over standing crops.

Another advantage of the present disclosure is to provide an apparatus for seeding as a cover crop over fully grown standing corn or soy beans.

Another advantage of the present disclosure is to provide an agricultural system including a seeding apparatus and trailer that have a transport width less than or equal to road vehicle width regulation.

Another advantage of the present disclosure is to provide a trailer capable of adjusting its width.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 5A is a front perspective view of an embodiment of a material mixing and pressurization system according to the invention.

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
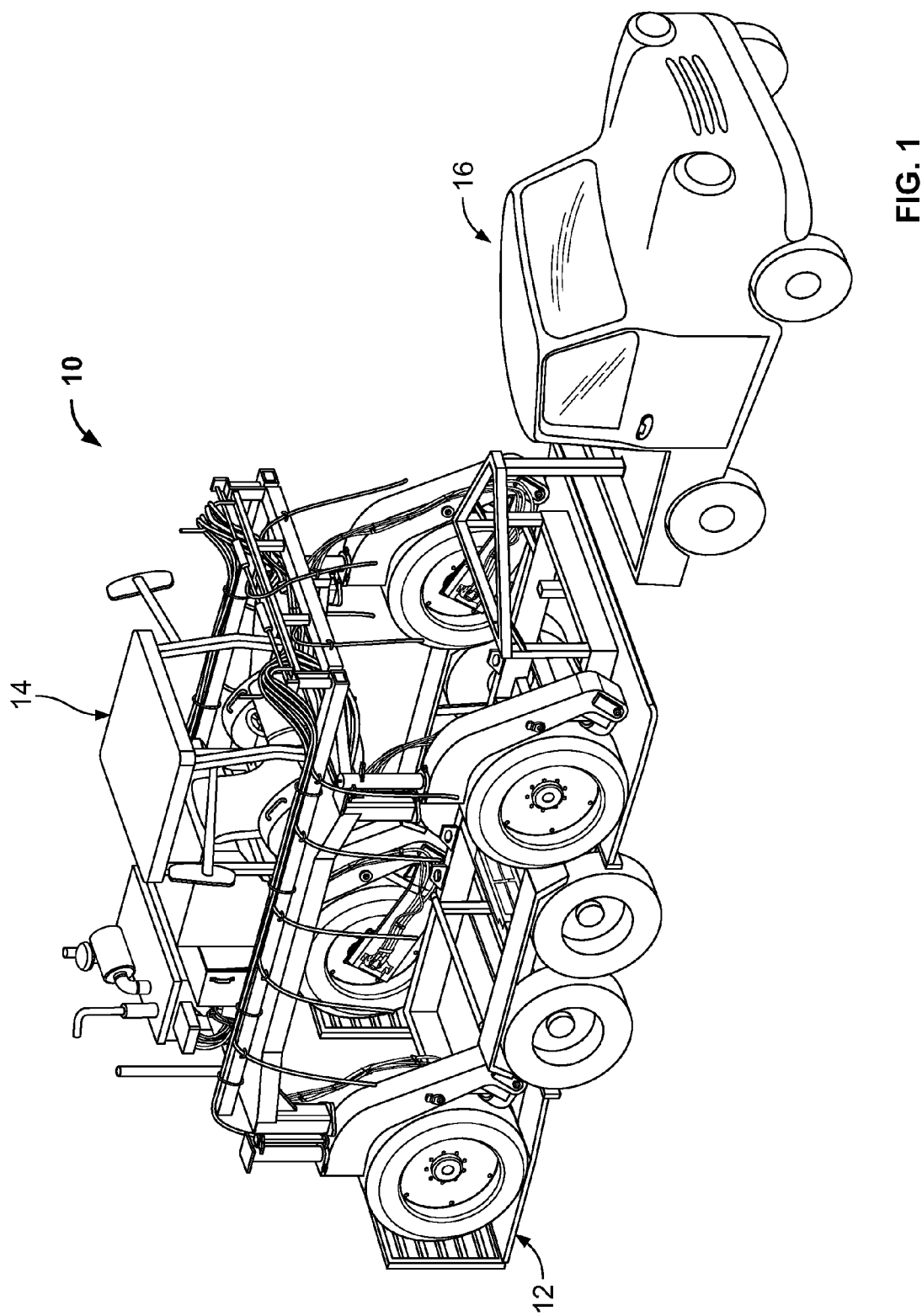
FIG. 1 is a perspective view of an agricultural system in a transport configuration according to an embodiment of the present disclosure.

FIG. 1 shows an embodiment of an agricultural system 10 according to the present invention. The agricultural system 10 includes a trailer 12 and an applicator 14. The agricultural system 10 is shown attached to a vehicle 16. The vehicle 16 is a pickup truck. In another embodiment, the vehicle 16 may be a truck, tractor, or any motorized equipment capable of moving or towing the agricultural system 100. FIG. 1 shows the applicator 14 mounted on the trailer 12 in a transport configuration.

Figure 2:
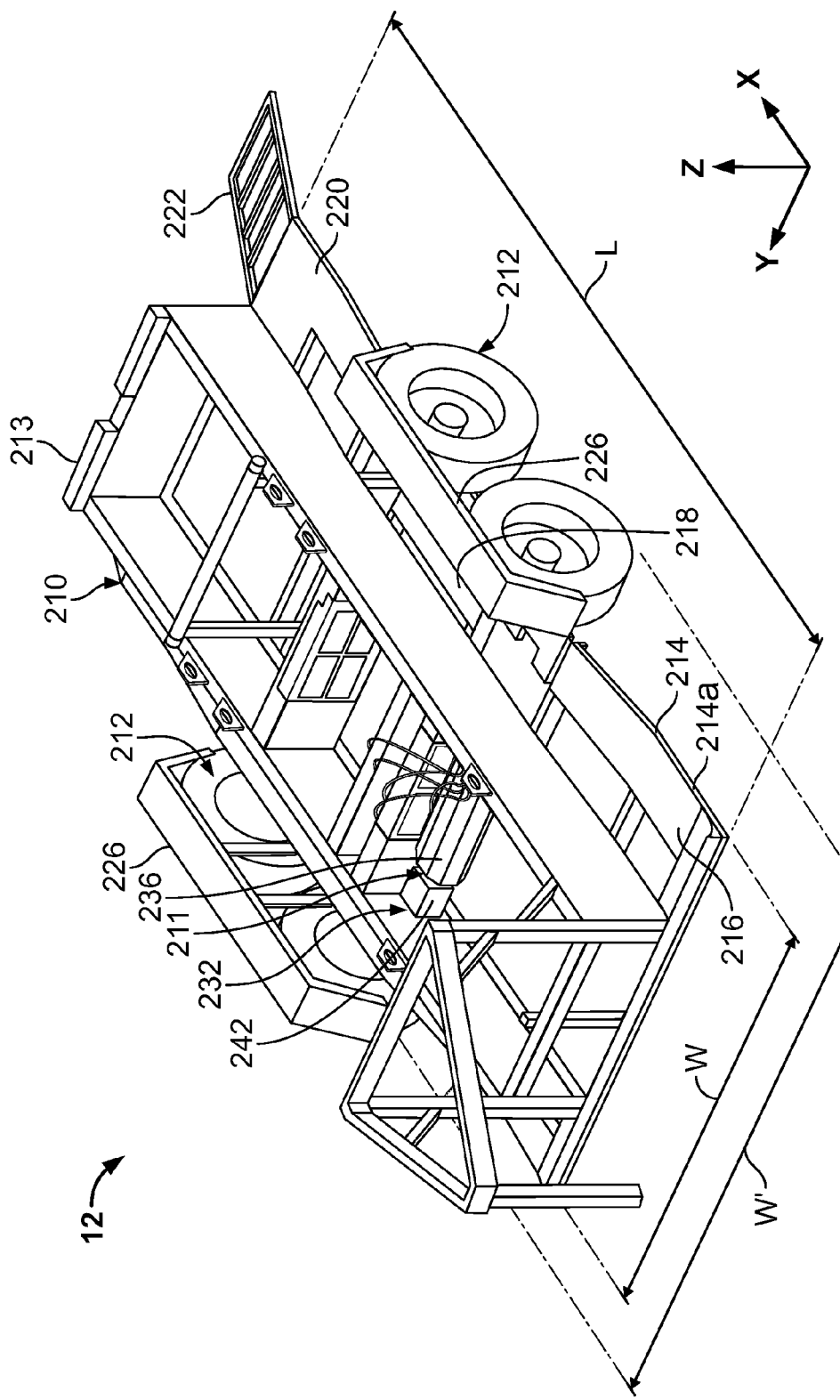
FIG. 2 is a front perspective view of a trailer in a loading configuration according to an embodiment of the present disclosure.
Figure 3:
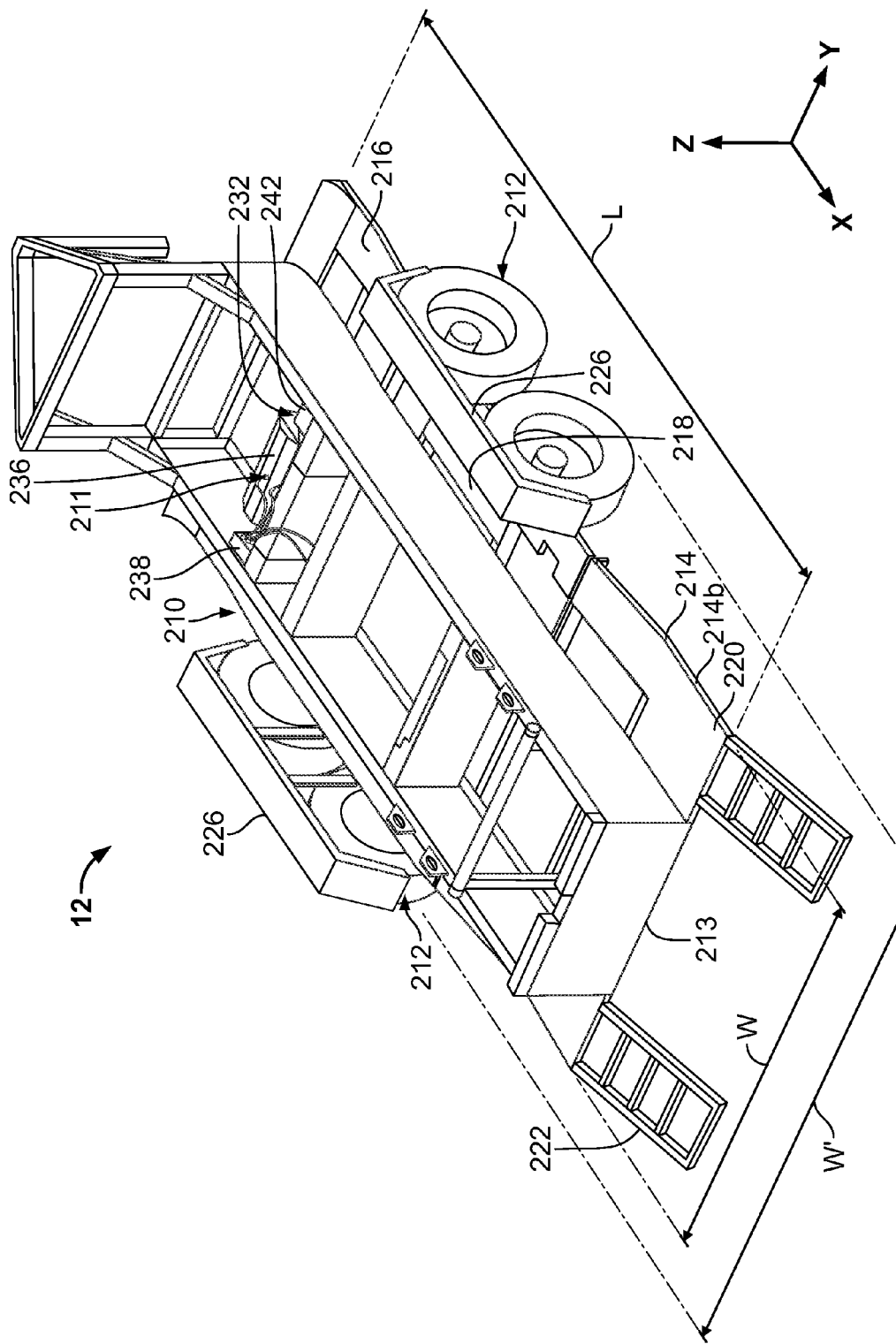
FIG. 3 is a rear perspective view of the trailer of FIG. 2.

FIGS. 2 and 3 show a more detailed view of the trailer 12 in a loading configuration. As can be seen in FIGS. 2 and 3, the trailer 12 includes a frame 210, control system 211, and wheels 212. As can be further seen in FIGS. 2 and 3, the trailer has a length L, a first width W, and a second width W'. The length L is in the X direction, and the first and second widths W, W' are in the Y direction. In this exemplary embodiment, the trailer 12 includes four wheels 212, two wheels 212 disposed on opposite sides of the trailer 12. In another embodiment, the trailer 12 may include one or more wheels 212 disposed on opposing sides of the trailer 12.

The frame 210 includes a center or base section 213 and wheel ramps 214 disposed on opposing sides of the base section 213. Each wheel ramp 214 a front section 216, a middle section 218, and a rear section 220. As can be seen in FIGS. 2 and 3, the middle section 218 is disposed or located between the front and rear sections 216, 220 in the transport configuration. As can further be seen in FIGS. 2 and 3, the front, middle and rear sections 216, 218, 220 are aligned in the X direction or in the direction of the length L of the trailer 12 to form the wheel ramps 214 when the trailer 12 is in the loading configuration. Furthermore, the wheels 212 are attached to the middle sections 218 and located adjacent to the wheel ramps 214 when the trailer 12 is in a loading configuration.

The frame 210 further includes ramps 222 connected to the rear section 220. Ramps 222 are pivotally connected to the wheel ramps 214 to rotate upward when in a transport configuration (see FIG. 4). In another embodiment, the ramps 222 may be releasably connected to the wheel ramp 214 to allow the ramp 222 to be removed from the rear section 220. In yet another embodiment, the ramps 222 may be adjustably or releasably connected to the rear section 220 to allow the ramps 222 to slide underneath the rear section 220 for storage. In another embodiment, the frame 210 may not include ramps 222. The frame 210 further includes fenders 226 attached to the middle section 218. The fenders 226 cover the wheels 212. In another embodiment, the frame 210 may not include fenders 226.

The control system 211 includes a power system 232 and a hydraulic system 236. The hydraulic system 236 includes a hydraulic pump and motor (not shown), a hydraulic distribution control 238 (FIG. 3), and one or more hydraulic actuators (not shown) configured to move the middle sections 218 in the Y direction or in the direction of the width W of the trailer 12. The power system 232 includes a battery 242 and on/off controls (not shown) that provide and control power to the hydraulic motor, respectively. The battery 232 may include a power connection that allow the battery 232 to be charged by a secondary power source (not shown). The secondary power source may be an electrical system (not shown) of the vehicle 16 (FIG. 1).

Figure 4:
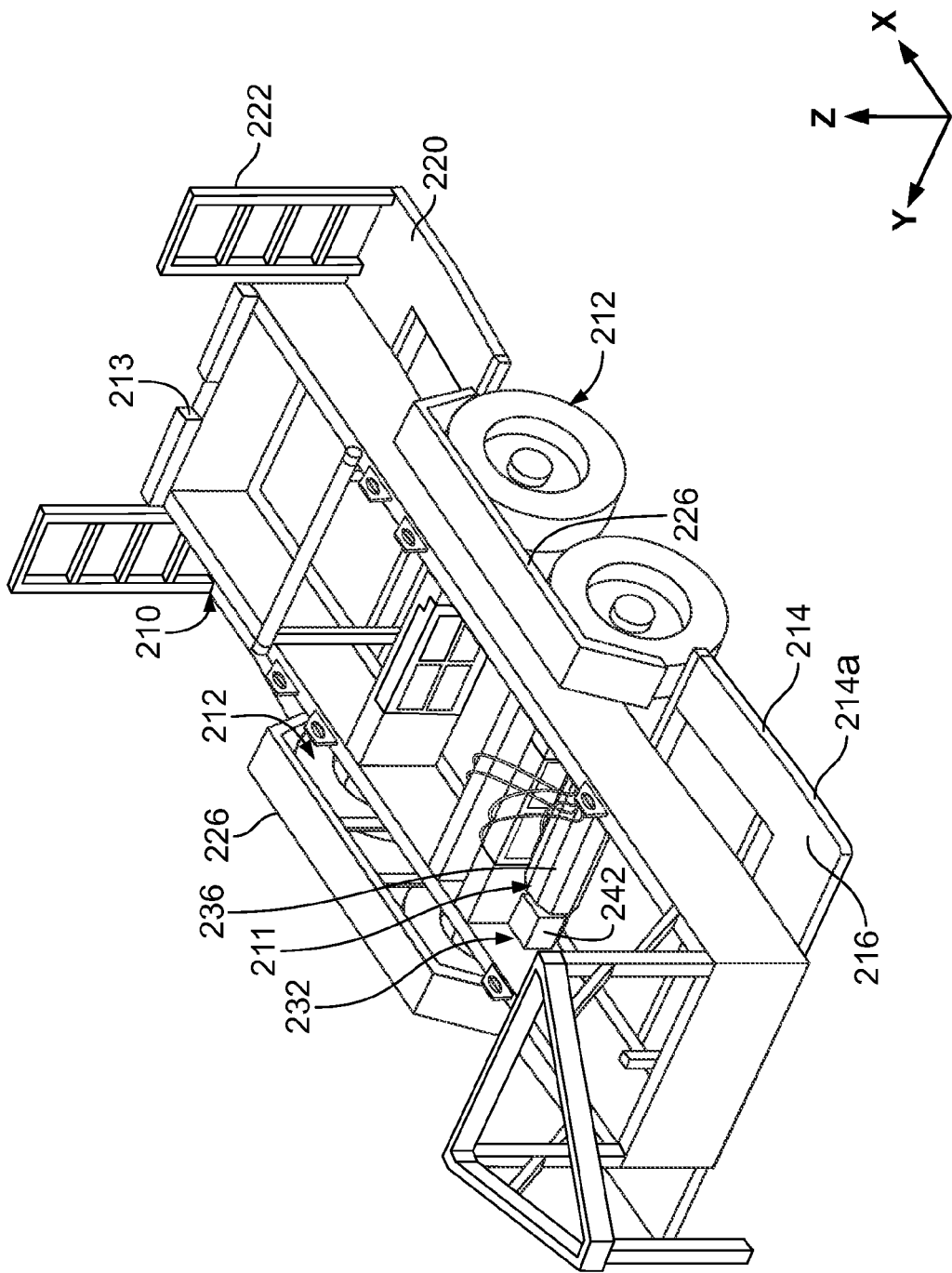
FIG. 4 is a front perspective view of the trailer of FIG. 2 in a transport configuration.

FIG. 4 show a more detailed view of the trailer 12 in a transport configuration, as also shown in FIG. 1. As can be seen in FIG. 4, the middle section 218 has been retracted underneath or below the base section 213 so that the wheels 212 are now disposed between the front section 216 and the rear section 220. Similarly, the fenders 226 are now also disposed between the front and rear sections 216, 220 in the transport configuration.

Figure 5:
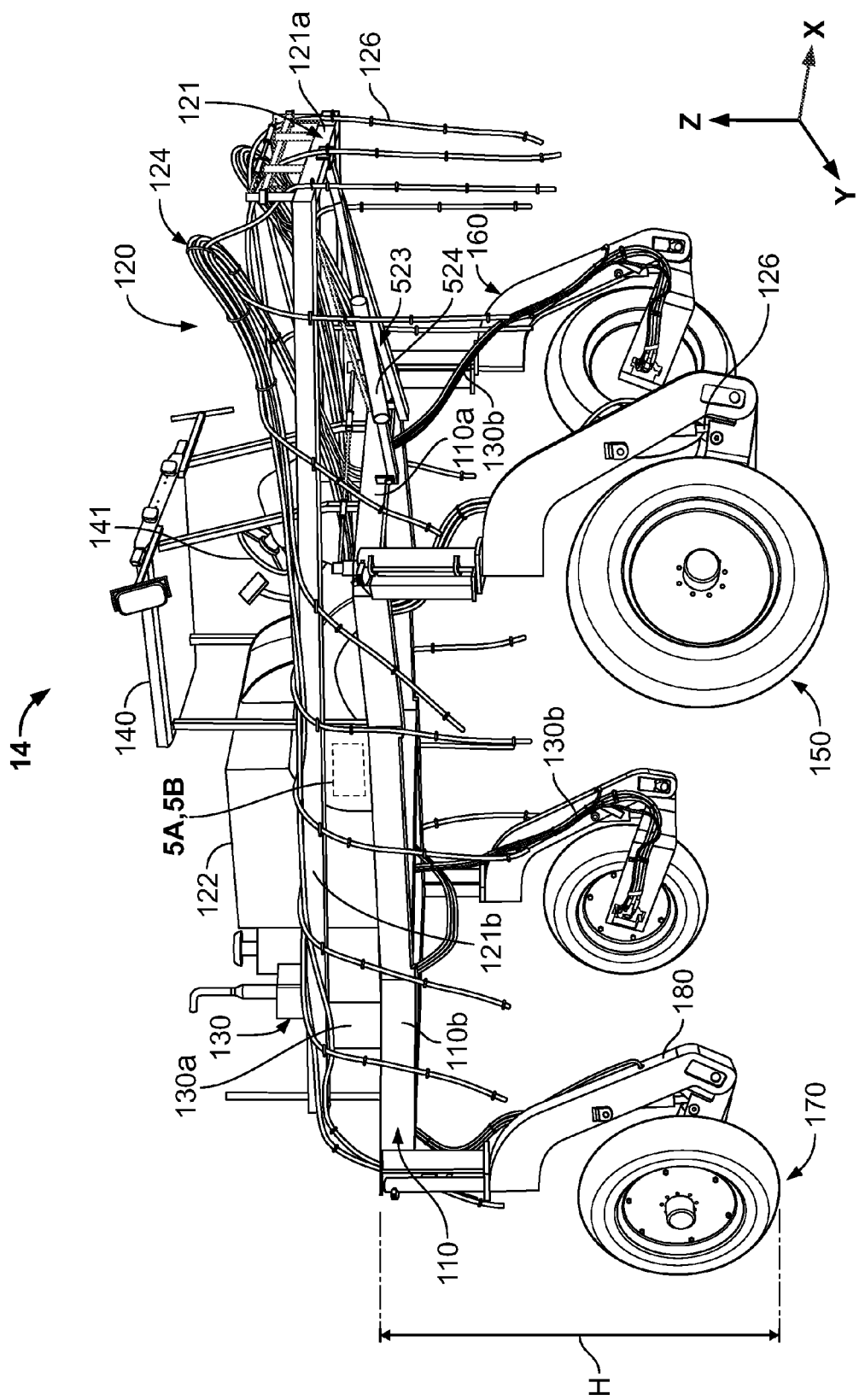
FIG. 5 is a front perspective view of an exemplary embodiment of an applicator according to the present disclosure.
Figure 6:
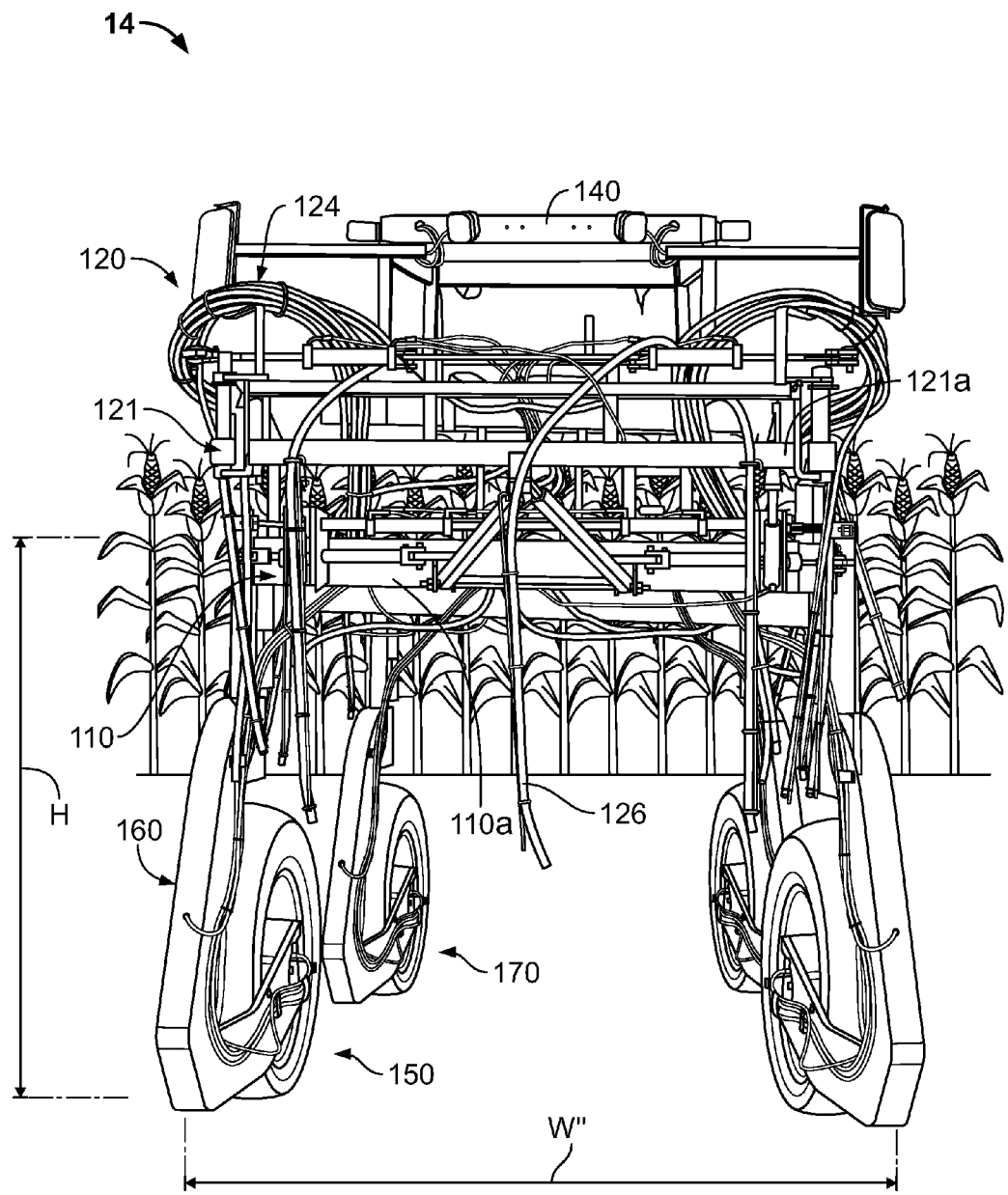
FIG. 6 is a front view of the applicator of FIG. 5.
Figure 7:
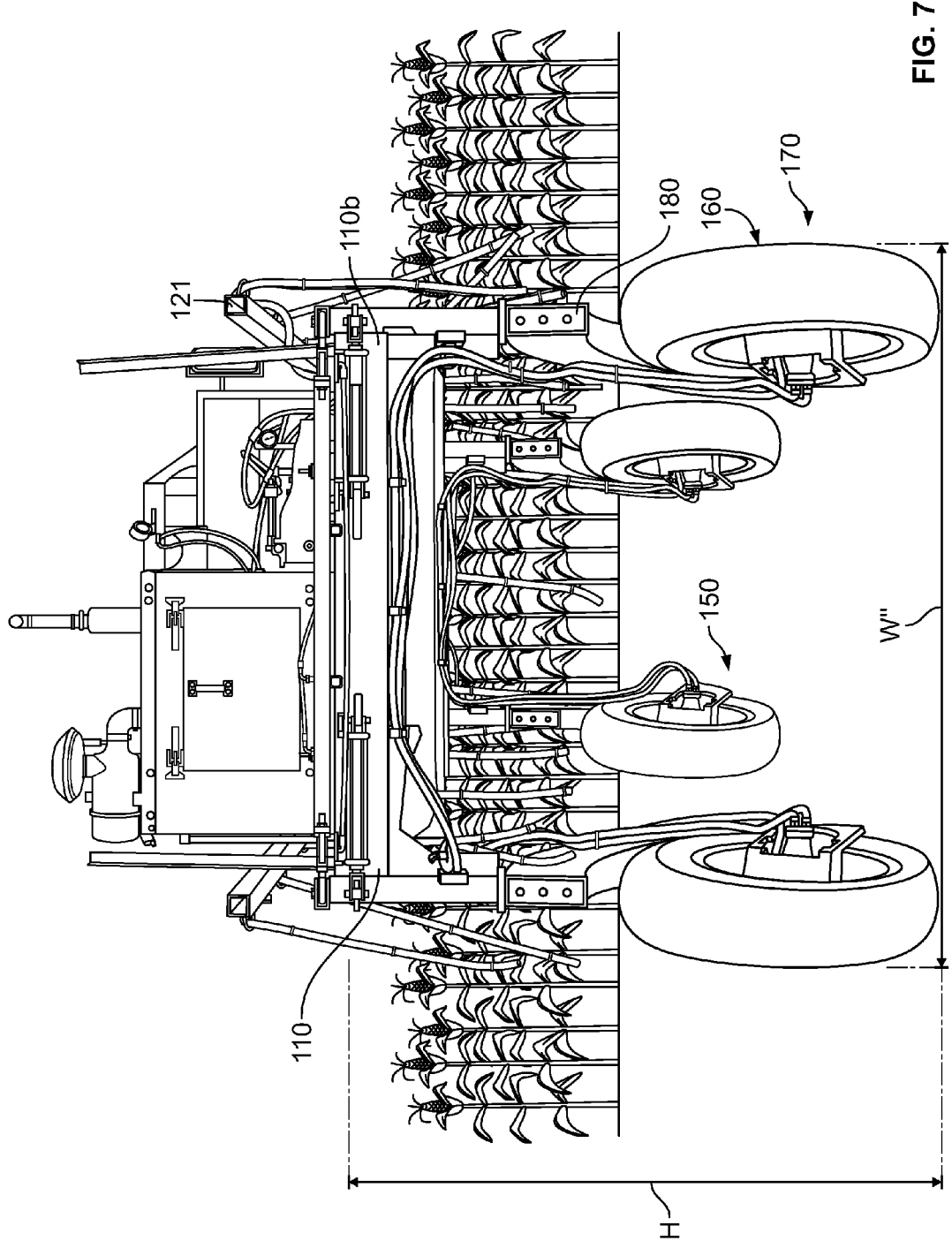
FIG. 7 is a rear view of the applicator of FIG. 6.

FIGS. 5, 6 and 7 show an exemplary embodiment of an applicator 14 in a transport configuration, as also shown in FIG. 1, according to the present disclosure. The applicator 14 includes a frame 110, a material applicator system 120, a power system 130, an operator cab 140, and a steering system 141. The applicator 14 further includes a front pair of wheel assemblies 150 and a rear pair of wheel assemblies 170 attached to the frame 710. The front and rear pair of wheel assemblies 150, 170 each include two wheel assemblies 160.

The frame 110 includes a front section 110a, a rear section 110b, and two side sections 110c disposed between the front and rear sections 110a, 110b. The frame 110 has a first width W", a length L", and a first height H above a support surface (not shown). In one embodiment, the support surface is the ground. In another embodiment, the support surface is a road. In yet another embodiment, the support surface is ground supporting an agricultural crop.

The applicator 14 further includes a power system 130 and a cab 140. The power system 130 is a diesel engine 130a coupled to a hydraulic pressure system (not shown). The hydraulic pressure system includes hydraulic lines 130b for providing hydraulic fluid to drive the wheel assemblies 160. The hydraulic pressure system further includes additional hydraulic lines coupled to various hydraulic actuators that operate the various components of the applicator 14, such as, but not limited to, the boom 121, wheel assemblies 160, the steering system 141, and other hydraulically powered systems. In another embodiment, the power system 130 may be a gas, diesel or electric power system. The power system 130 further includes a power system control (not shown) in the cab 140 for operating the power system 130. For example, the power system control may include a speed control for adjusting the speed of the applicator 14 and the operation of the hydraulic actuators.

The applicator 14 further includes a material application system 120. The material application system 120 is attached to and supported by the frame 110. In one embodiment, the material application system 120 is a seed spreader system. In another embodiment, the material application system 120 is capable of applying seed, fertilizer, pesticide, herbicide or other crop or soil supplement. For example, the fertilizer may be a solid, liquid or combination thereof. In one embodiment, the fertilizer may be liquid nitrogen, The material application system 120 includes a boom 121 pivotally attached to the frame 110. The boom 121 includes a middle section 121a and two end sections 121b disposed on either end thereof. As can be seen in FIG. 5, the end sections 121b are folded against the side sections 110b of the frame 110 in a retracted, stored or transport configuration. The material application system 120 further includes a boom hydraulic system 523. The boom hydraulic system 523 includes one or more hydraulic actuators 524 and hydraulic lines (not shown) for raising and lowering the boom 121. The boom hydraulic system 523 further includes hydraulic actuators and hydraulic lines (not shown) for extending and retracting the two end sections 121b. The boom hydraulic system 523 further includes a boom control system (not shown for controlling the raising, lowering, and extending of the boom 121.

The material application system 120 further includes a material storage container 122, a material mixing and pressurization system 123 (shown in FIGS. 5A and 5B), and a material conduit system 124 for distributing material under pressure. The material application system 120 further includes material distribution lines 124. The distribution lines 124 may be hose, tubing, or other similar conduits. The distribution lines 124 may be formed of a polymer, plastic, metal or any combination thereof. In another embodiment, the material application system 120 may include material deflectors at the ends of the distribution lines 124.

The material distribution lines 124 include an extension section 126 extending vertically downward or in a Z direction from the boom 121. In one embodiment, the extension section 126 may extend greater than 1 foot downward. In another embodiment, the extension section 126 may extend three or more feet downward. In another embodiment, the extension section 126 may extend five or more feet downward. In another embodiment, the extension section 126 may extend less than one foot downward. In another embodiment, the extension section 126 may terminate and be directed downward along the boom 121. In yet another embodiment, the extension section 126 may terminate to nozzles or sprayers that direct the material. In yet another embodiment, the extension section 126 may terminate to nozzles or sprayers that are fastened or connected to the boom 121. In yet another embodiment, the extension sections 126 may be omitted and the material distribution lines 124 may terminate along the boom and/or frame 110 and may include material deflectors (not shown) attached to the ends thereof.

A material distribution control (not shown) controls the distribution of material to the one or more lines of the material distribution lines 124. The distribution of material to the one or more lines of the material distribution lines 124 is explained in further detail below. The material distribution system 120 further includes a material distribution control system (not shown) for controlling the flow and application of material. In one embodiment, the material distribution control system is located in the cab 140.

FIG. 5A shows a front perspective view of the material mixing and pressurization system 123, and the connection between the material mixing and pressurization system 123 and the material conduit system 124. Material from the material storage container 122 is mixed and pressurized by air from the pressurization unit 127 (FIG. 5B) and distributed by the material distribution lines 124.

Figure 5B:
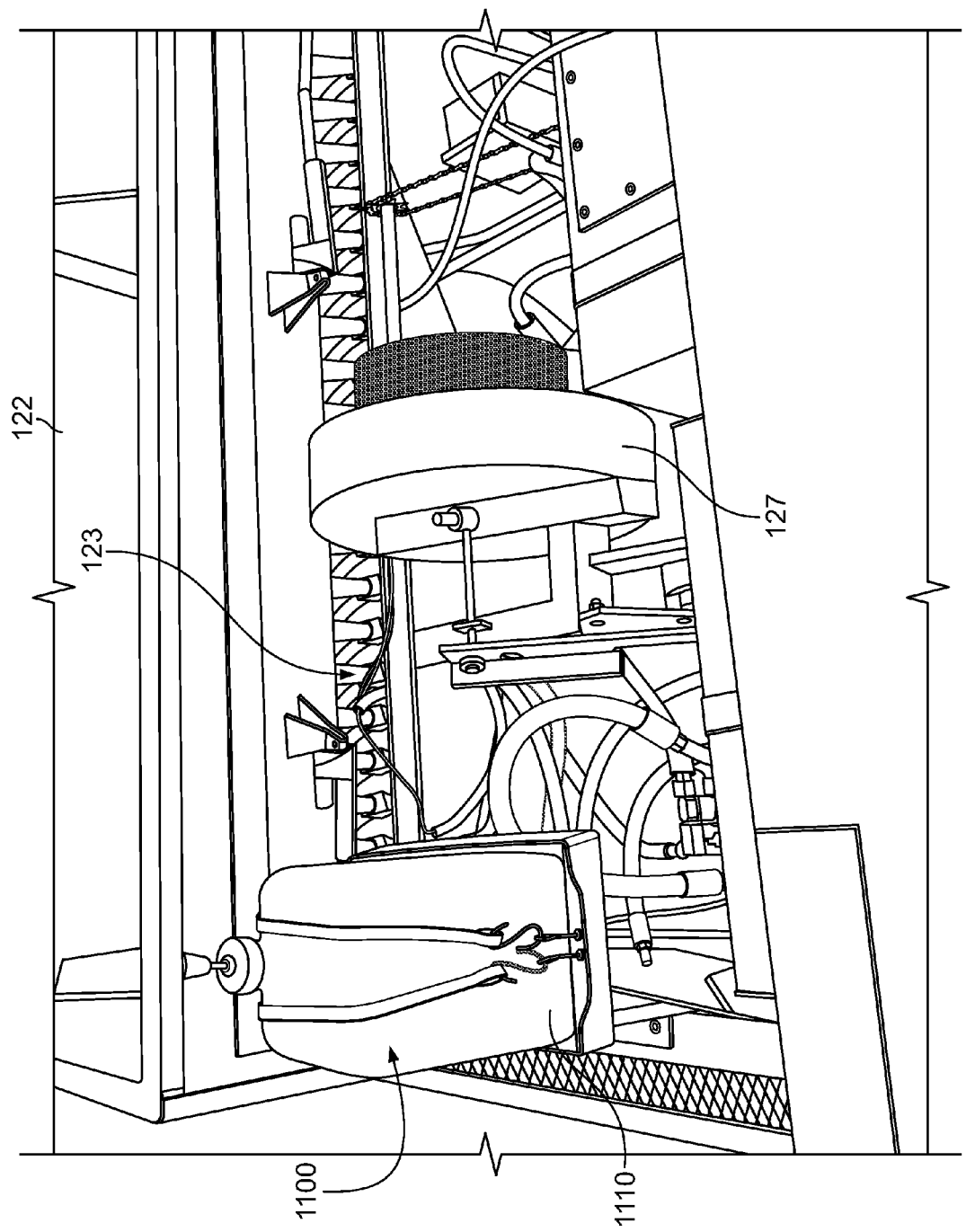
FIG. 5B is a rear perspective view of the material mixing and pressurization system of FIG. 5A.

FIG. 5B shows a rear perspective view of the material mixing and pressurization system 123. As can be seen in FIG. 5B, the material mixing and pressurization system 123 further includes a pressurization unit 127. In this exemplary embodiment, the pressurization unit 127 is a fan.

FIG. 5B also shows a travel marker system 1100. The travel marker system 1100 deposits a marker to the surface underneath the apparatus 100 as the apparatus 100 travels over the surface. The travel marker system 100 includes a marker container 1110 for storing the marker and a marker distribution system conduit for directing the marker to the ground below the applicator 14. In one embodiment the marker is a dye. In another embodiment, the travel marker system 1100 may be omitted from the applicator 14.

Referring again to FIGS. 5, 6 and 7, and as discussed above, the applicator 14 includes a front pair of wheel assemblies 150 and a rear pair of wheel assemblies 170 attached to the frame 110. The wheel assemblies 160 are shown in FIGS. 5, 6 and 7 in a lowered position or transport configuration.

Figure 8A:
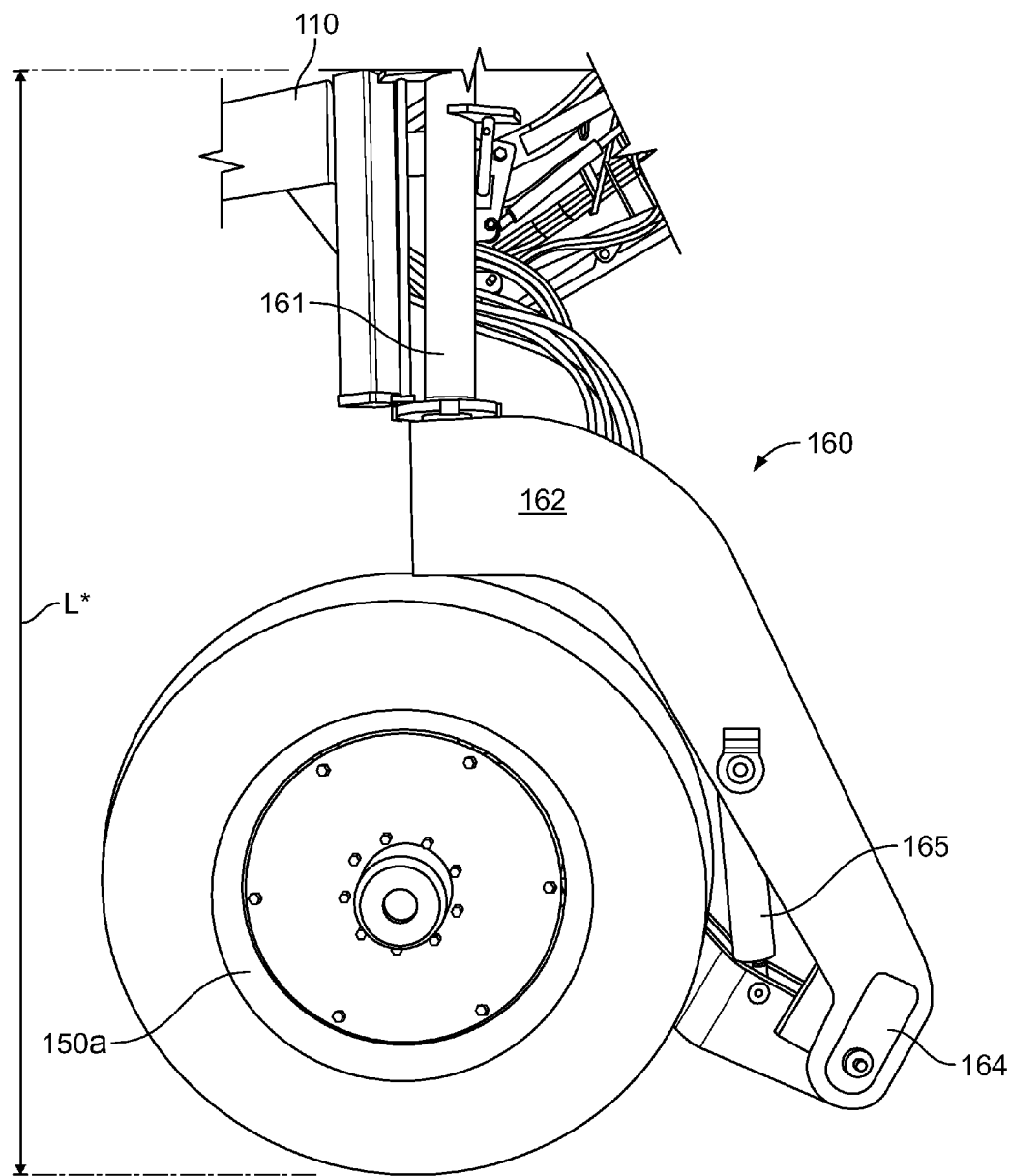
FIG. 8A is perspective view of a wheel assembly of FIG. 5 according to an embodiment of the present disclosure.
Figure 8B:
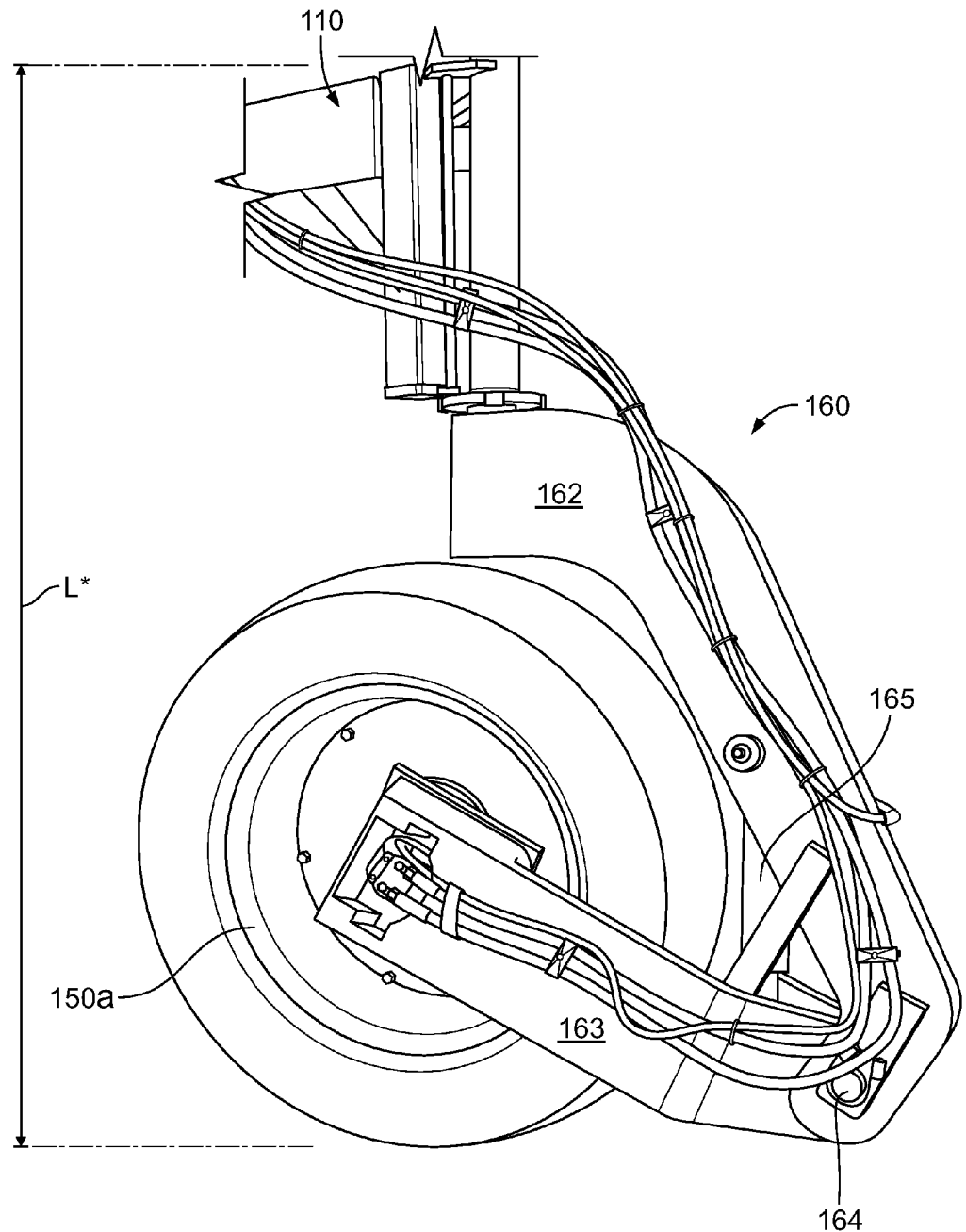
FIG. 8B is another view of the wheel assembly of FIG. 8A.

A more detailed view of a wheel assembly 160 in a lowered position is shown in FIGS. 8A and 8B. As can be seen in FIGS. 8A and 8B, wheel assembly 160 includes an upper support component 161, an upper arm component 162 and a lower arm component 163. The upper support component 161 attaches the wheel assembly 755 to the frame 710. The upper support component 161 also attaches to the upper arm component 161. The upper arm component 162 and the lower arm component 163 are pivotally connected at a pivotal connection 164. The lower arm component 163 includes a hydraulic drive (not shown) connected to the hydraulic lines 130b for rotating each wheel 150a (see FIG. 8B). The wheel assembly 160 in a lowered configuration has a length L* from the ground to the attachment point to the frame 110. In one embodiment, the length L* may be greater than or equal to about 3 feet. In another embodiment, the length L* may be greater than or equal to about 4 feet. In another embodiment, the length L* may be greater than or equal to about 5 feet. In another embodiment, the length L* may be greater than or equal to about 6 feet. In another embodiment, the length L* may be greater than or equal to about 7 feet. In yet another embodiment, the length L* may be greater than or equal to about 8 feet.

The wheel assembly 160 further includes a telescoping device 165. The telescoping device 165 is a hydraulic actuator. In another embodiment, the telescoping device 165 may be a linear actuator. In another embodiment, the telescoping device 165 may be a linear extendable device. In another embodiment, the telescoping device 165 may be powered by hydraulic, mechanical, electrical or any combination thereof. In another embodiment, the wheel assemblies 160 may further include a suspension system (not shown) for providing suspension travel to each wheel assembly 160. In one embodiment, the suspension system may be air, gas, fluid, mechanical or any combination thereof, or other known suspension systems. In one embodiment, the wheel assembly 160 may include a hydraulic nitrogen accumulator to provide suspension travel to each wheel assembly 160. In another embodiment, the wheel assembly 160 may include a mechanical suspension, such as, but not limited to, as spring suspension.

Figure 9:
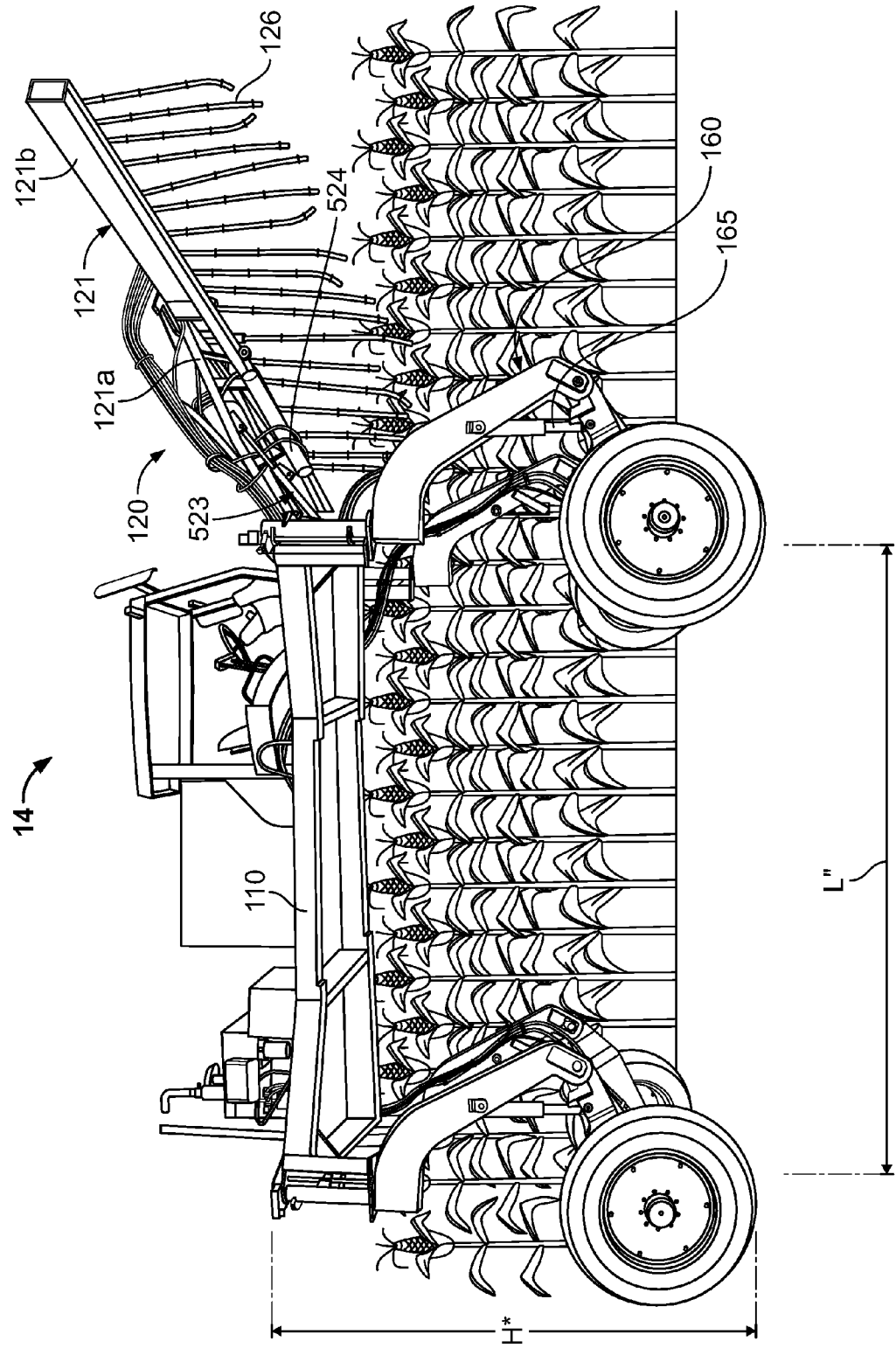
FIG. 9 is a side perspective view of the applicator of FIG. 5 in a raised or application configuration.
Figure 10A:
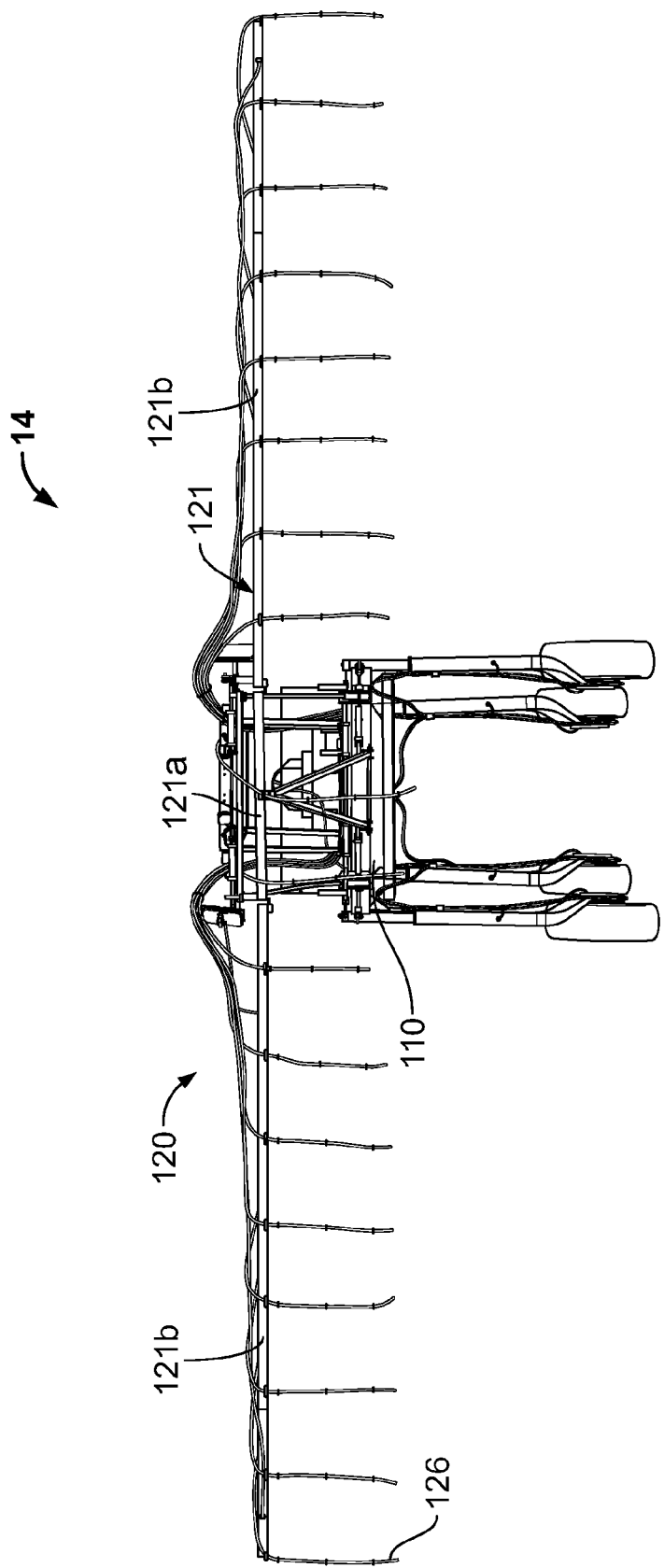
FIG. 10A is a front view of the applicator of FIG. 9.

FIGS. 9 and 10 show the applicator 14 in a raised or application configuration. As can be seen in FIGS. 9 and 10, the wheel assemblies 160 have been extended or increased in length to raise the frame 110 to a second height H* greater than the first height H (FIG. 5).

Figure 10B:
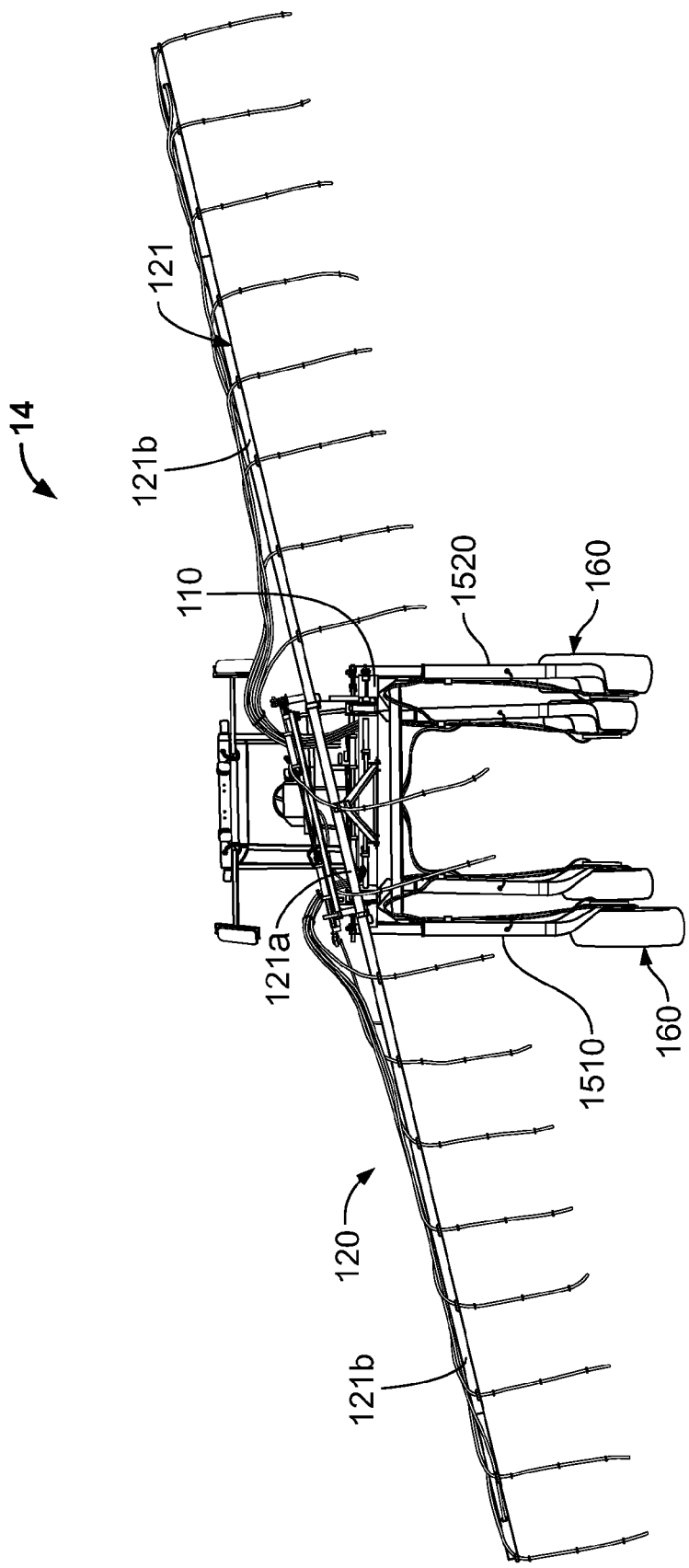
FIG. 10B is a front view of the applicator of FIG. 9 having the boom tilted and opposing wheel assemblies extended different amounts.

As can further be seen in FIGS. 9 and 10, the material application system 120 is in a deployed or application configuration. As such, the boom 121 has been extended and the two end sections 121b have been extended in the X direction, or in other words, in the direction of the width W" (FIGS. 6 and 7). The boom hydraulic system 523 is capable of vertically raising and lowering the boom 121 vertically or in the Z direction. The boom hydraulic system 523 is also capable of tilting the boom 121 as shown in FIG. 10B. In FIG. 10B, the boom 121 is shown tilted in a one direction, however, the boom hydraulic system 523 is also capable of tilting the boom 121 in the opposite direction (not shown).

In another embodiment and as shown in FIG. 10B, wheel assemblies 160 are extended on a first side 1510 of the applicator 14 to a second length L (FIGS. 11A and 11B) and are not extended (see FIGS. 8A and 8B) or are less extended on the opposing second side 1520. In another embodiment, the wheel assemblies 160 on one side of the applicator 14 are extended to a second length L and the wheel assemblies 160 on the opposite side are extended to a different second length L**. In such a manner, the applicator 14 may more easily traverse a sloped or inclined ground surface. In one embodiment, the applicator 14 may traverse a sloped or inclined ground surface while maintaining the frame in a level or approximately level condition.

Figure 11A:
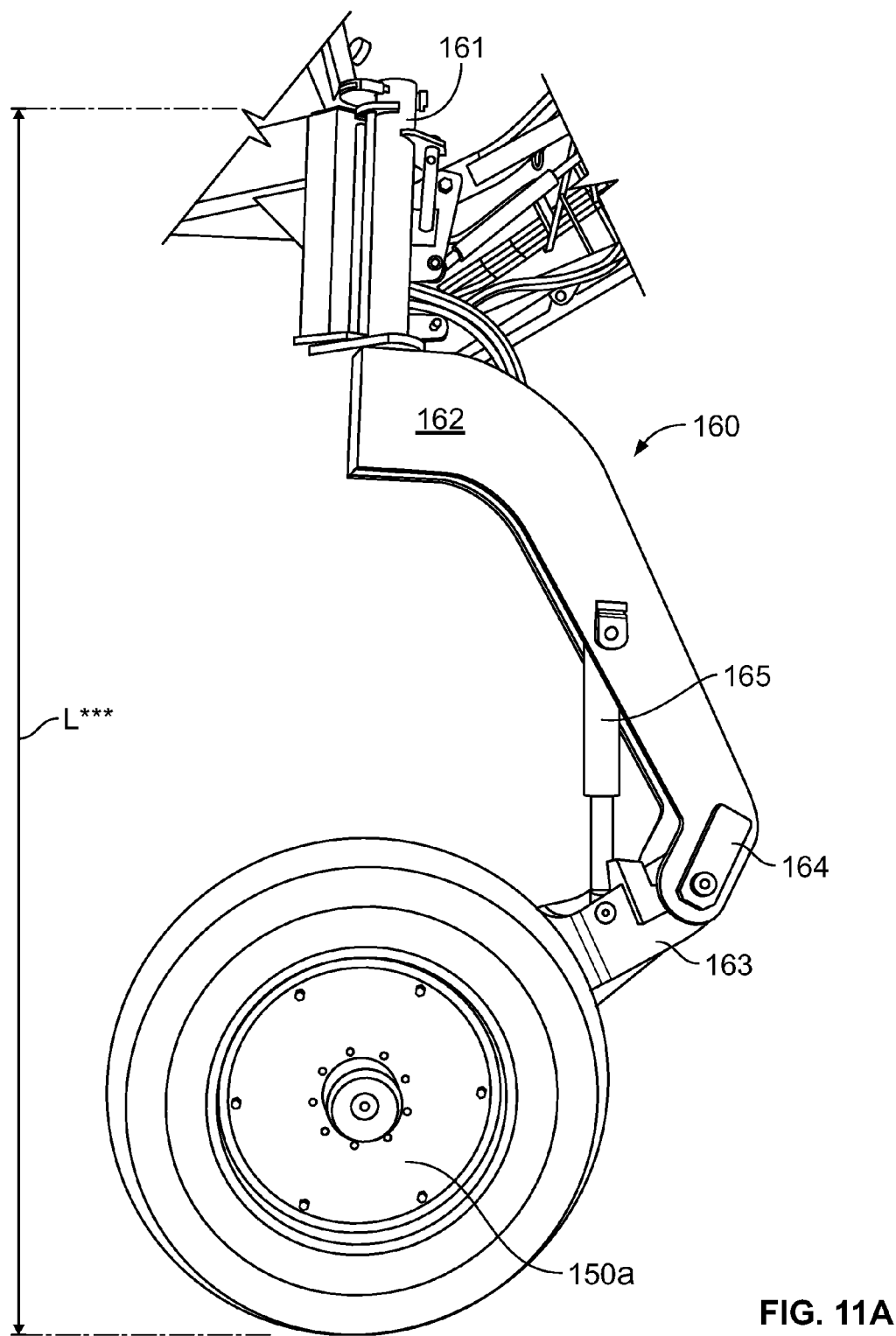
FIG. 11A is a side perspective view of a wheel assembly according to an embodiment of the invention.
Figure 11B:
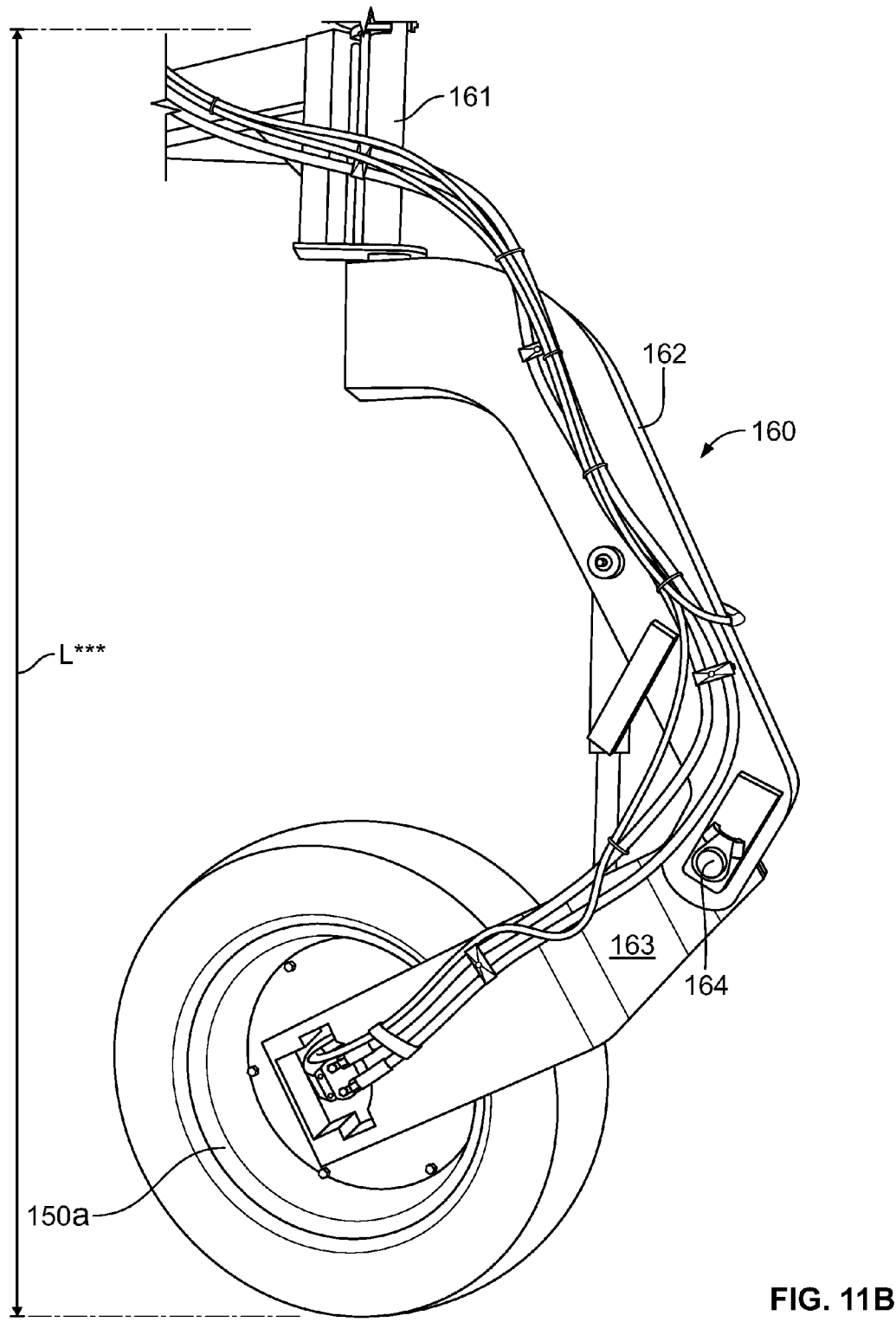
FIG. 11B is a side perspective view of the wheel assembly of FIG. 11A from the opposite side.

A more detailed view of a wheel assembly 160 in an extended configuration can be seen in FIGS. 11A and 11B. As can be seen in FIGS. 11A and 11B, the telescoping device 165 has been extended. Extending the telescoping device 165 pivots the lower arm component 163 about pivotal connection 164 to increase the length of the wheel assembly 755 to a length L** greater than L* (FIGS. 8A and 8B) by urging the lower arm component 163 pivotally away from the upper arm component 162.

In one embodiment, the length L may be greater than or equal to about 4 feet. In another embodiment, the length L may be greater than or equal to about 5 feet. In another embodiment, the length L may be greater than or equal to about 6 feet. In another embodiment, the length L may be greater than or equal to about 7 feet. In another embodiment, the length L may be greater than or equal to about 8 feet. In another embodiment, the length L may be greater than or equal to about 10 feet. In another embodiment, the length L may be greater than or equal to about 12 feet. In another embodiment, the length L may be greater than or equal to about 14 feet. In yet another embodiment, the length L** may be greater than or equal to about 16 feet.

Figure 12A:
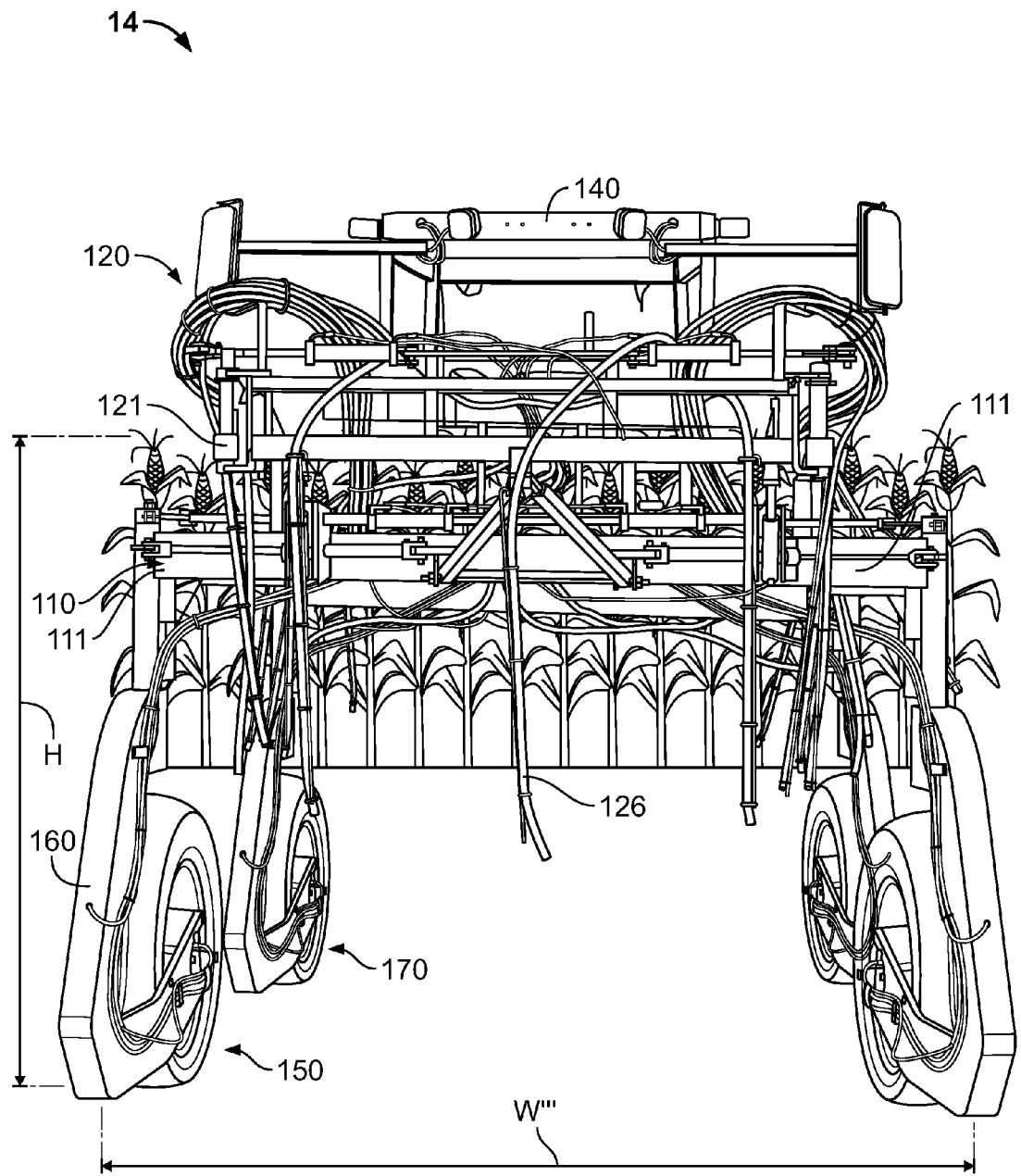
FIG. 12A is a front perspective view of the applicator of FIG. 5 having the width of the frame widened.
Figure 12B:
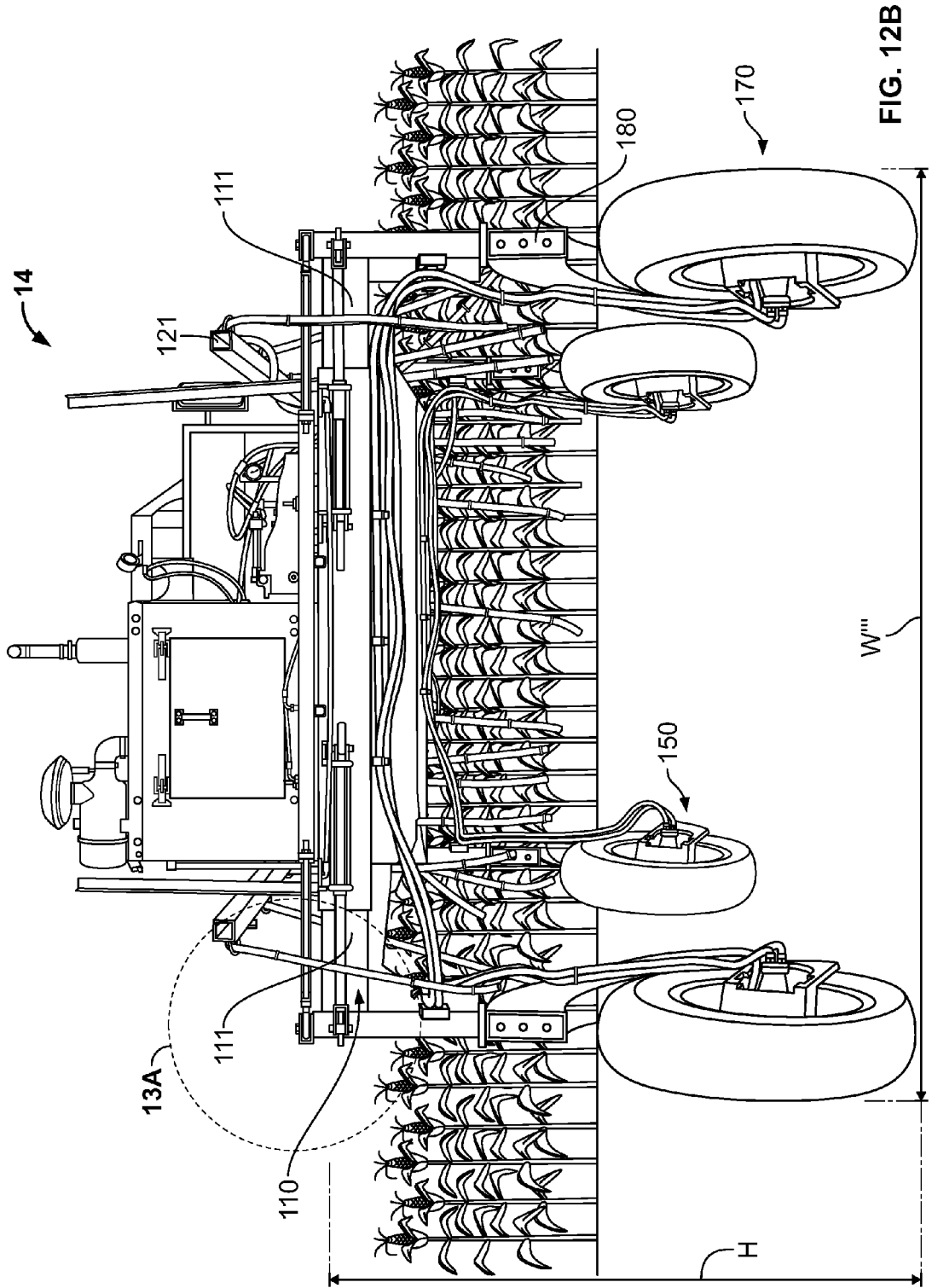
FIG. 12B is a rear perspective view of the applicator of FIG. 5 having the width of the frame widened.

The applicator 14 further includes the capability to increase the first width W'' to a greater second width W'''. FIGS. 12A and 12B shows a front view of the applicator 14 in a lowered or transport configuration as shown in FIG. 5, but with the frame 110 widened. As can be seen in FIGS. 12A and 12B, the frame 110 includes a telescoping extension 111 (FIG. 13B) that can be extended or retracted to widen or narrow the frame 110. The telescoping extension 111 is extended and retracted by a telescoping device 112. The telescoping device 112 may be a hydraulic actuator. In another embodiment, the telescoping device 112 may be any type of linear actuator as discussed above. In another embodiment, the width of the frame 110 is widened to a second width W''' when the applicator is in a raised or application configuration (not shown). In an embodiment, the second width W''' is more than 1 inch greater than the first width W''. In another embodiment, the second width W''' is more than 1 foot greater than the first width W''. In another embodiment, the second width W''' is more than 2 feet greater than the first width W''. In another embodiment, the second width W''' is more than four feet greater than the first width W''.

Figure 13A:
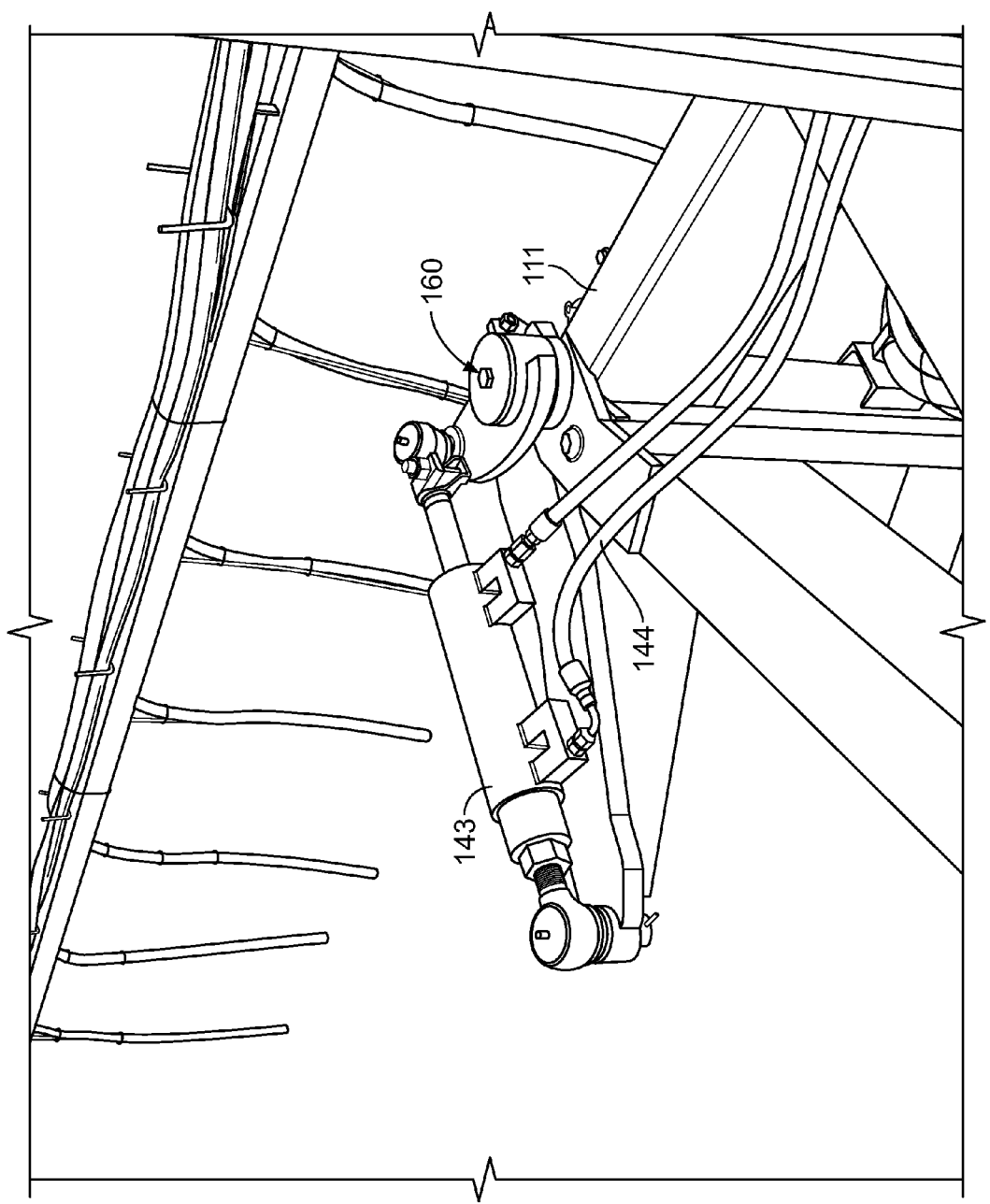
FIG. 13A is a perspective partial view of a components of the steering system according to an embodiment of the invention.
Figure 13B:
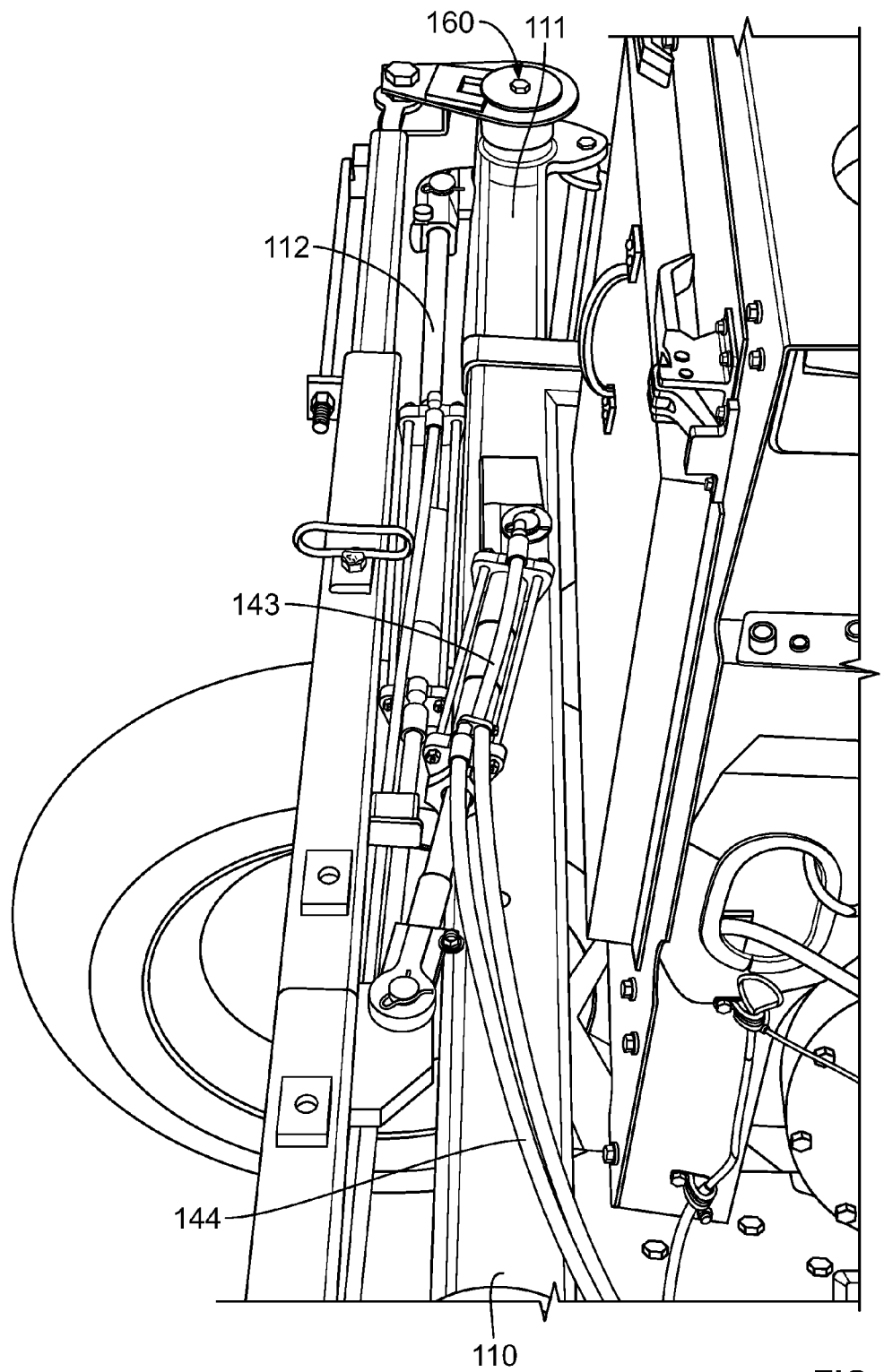
FIG. 13B is a perspective partial view of components of a steering system according to another embodiment of the invention.

Referring back to FIG. 5, the applicator 14 further includes a steering system 141. The steering system 141 includes a steering wheel 141a. Referring to FIG. 13A, the steering system 141 further includes actuators 143 and hydraulic lines 144 for pivoting wheel assemblies 160 about the frame 111. In this exemplary embodiment, the steering system 141 provides steering to all four wheel assemblies 160. In another embodiment, the steering system 141 provides steering to the front and/or rear pair of wheel assemblies 150, 170. In this exemplary embodiment, the steering system 141 provides counter steering to the rear pair of wheel assemblies 170 so the rear wheel assemblies 160 follow the wheel paths of the corresponding front wheel assemblies 160. In such a manner, a minimal ground footprint is make by the moving applicator 14. In another embodiment, the front and rear pair of wheel assemblies 150, 170 may be synchronized and/or steered independently. The steering system 141 may include a row sensing system that guides and/or assists in guiding the applicator 14 between rows of a crop.

The applicator 14 may include additional controls, such as, but not limited to a guidance system (not shown). In one embodiment, the guidance system may include a global positioning system. In another embodiment, the additional controls may include, but not limited to, row sensing sensors and/or controls for positioning and/or maintaining the wheel assemblies between rows of crops or structures. In yet another embodiment, the additional controls may include additional sensors and/or controls for positioning the height of the frame 110 above a crop to be traversed and/or to position the boom 121 at a predetermined height above the crop to be traversed.

Figure 14:
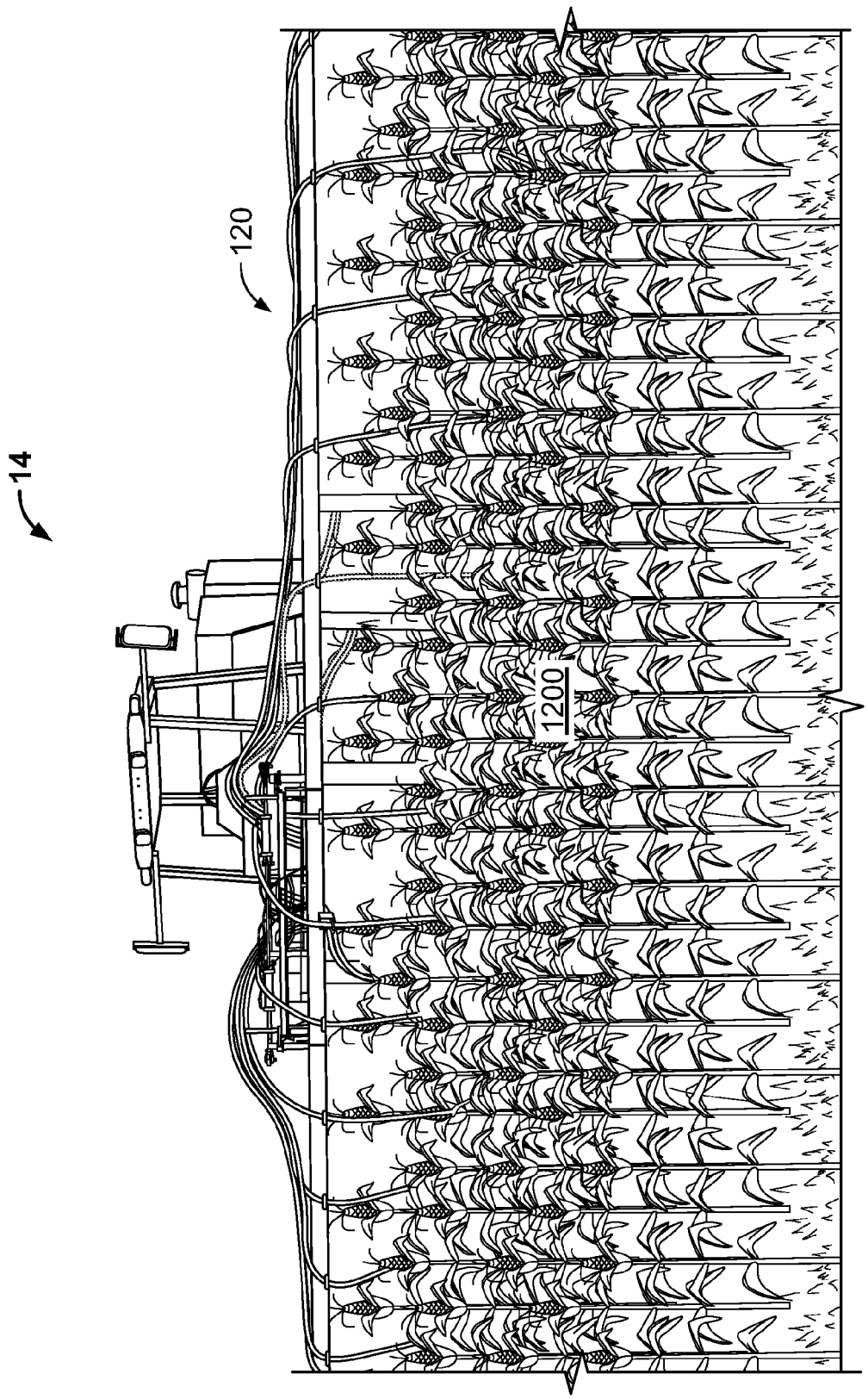
FIG. 14 is a perspective view of an application of the present invention.

FIG. 14 shows the applicator 14 applying a material to a standing crop 1200. In this exemplary embodiment, the applicator 14 is applying a seed material to the ground (not shown) between the rows of a standing crop 1200 of mature corn to provide a cover crop. In another embodiment, the applicator 14 may apply a material to the ground and/or standing crop 1200. As can be seen in FIG. 14. The height H* (FIG. 9) of the applicator 14 is selected to position the frame 110 above the standing crop 1200 and the distribution lines 126 extend between the rows of the standing crop 1200 and towards the ground.

While the disclosure has been described with reference to a preferred embodiment, it will be understood by those skilled in the art that various changes may be made and equivalents may be substituted for elements thereof without departing from the scope of the disclosure. For example, telescoping or linear devices may be hydraulically driven, and/or these devices may be driven with hydraulics, air, water, or electricity or any combination thereof.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for applying an agricultural material, comprising:
   a frame having a height above a support surface;
   a material distribution system attached to the frame; and
   a plurality of wheel assemblies having a length and attached to the frame;
   wherein the plurality of wheel assemblies comprise a first arm component and a second arm component pivotably connected to each other and defining an angle therebetween, a telescoping device positioned within the angle between the first arm component and the second arm component, the telescoping device pivotably connected to the first arm component and the second arm component for selectably varying a magnitude of the angle so as to increase and decrease the length of the plurality of wheel assemblies and thereby increase and decrease the height of the frame above the support surface.

2. The apparatus of claim 1, wherein the frame has a first width and is capable of extending to a second width greater than the first width, thereby increasing a width of opposing wheel assemblies.

3. The apparatus of claim 1, wherein the frame has a front section, a rear section, and a first side and an opposing second side disposed there between, and wherein wheel assemblies attached to the first side have a first length and wheel assemblies attached to the opposing second side have a second length different from the first length.

4. The apparatus of claim 1, wherein the material distribution system comprises a boom pivotally attached to the frame for supporting a material distribution system for distributing an agricultural material.

5. The apparatus of claim 4, wherein the boom is further attached to one or more actuators for vertically raising and lowering the boom.

6. The apparatus of claim 5, wherein sensors and controls position the frame and the boom at a predetermined height above the supporting surface.

7. The apparatus of claim 5, wherein the one or more actuators tilt the boom relative to the supporting surface.

8. The apparatus of claim 1, further comprising a steering system comprising actuators for pivoting wheel assemblies relative to the frame;

wherein the steering system provides counter steering of rear wheel assemblies behind corresponding front wheel assemblies so as to roll rear wheels of the rear wheel assemblies in the same track as corresponding front wheels.

9. The apparatus of claim 8, wherein the steering system further comprising row sensing sensors for positioning the material distribution system between crop rows.

10. The apparatus of claim 8, wherein the steering system further comprising a row sensing system for guiding the wheel assemblies between crop rows.

11. The apparatus of claim 1, wherein the material distribution system comprises an air pressurization system for distributing a material through a plurality of conduits.

12. The apparatus of claim 1, wherein the length of each of the plurality of wheel assemblies are independently adjustable so as to selectably increase and decrease portions of the frame above the support surface.

13. An apparatus for applying an agricultural material, comprising:

a frame having a height above a support surface;

a material distribution system movably attached to the frame comprising conduits positionable between rows of standing crops, ends of the conduits are movable for applying material to the support surface; and a plurality of wheel assemblies having a length and attached to the frame;

wherein the plurality of wheel assemblies comprise a first arm component and a second arm component pivotably connected to each other and defining an angle therebetween, a telescoping device positioned within the angle between the first arm component and the second arm component, the telescoping device pivotably connected to the first arm component and the second arm component for selectably varying a magnitude of the angle so as to increase and decrease the length of the plurality of wheel assemblies and thereby increase and decrease the height of the frame above the support surface.

14. The apparatus of claim 13, wherein ends of the conduits include material deflectors.

* * * * *